United States Patent [19]

Kumasaka

[11] Patent Number: 5,770,895
[45] Date of Patent: Jun. 23, 1998

[54] OPERATION CONTROL DEVICE AND METHOD FOR A PLURALITY OF ELECTRIC POWER CONSUMING SYSTEMS

[75] Inventor: Iwao Kumasaka, Kanagawa-Ken, Japan

[73] Assignee: Tokyo Electron Limited, Tokyo-to, Japan

[21] Appl. No.: 660,475

[22] Filed: Jun. 7, 1996

[30] Foreign Application Priority Data

Jun. 8, 1995 [JP] Japan ................................... 7-166881

[51] Int. Cl.$^6$ .................................................. G05B 6/02
[52] U.S. Cl. ................................ 307/32; 307/35; 307/38; 307/39; 364/492; 364/493
[58] Field of Search ................................ 307/11, 31, 32, 307/33, 34, 38, 39, 112, 116, 125, 126, 130, 131, 139, 140; 323/209, 205, 208; 364/483, 492, 493; 340/825.06, 825.09

[56] References Cited

U.S. PATENT DOCUMENTS

| | | | |
|---|---|---|---|
| 3,751,676 | 8/1973 | Igarashi | 307/31 |
| 4,211,933 | 7/1980 | Hedges | 307/38 |
| 4,245,319 | 1/1981 | Hedges | 307/38 |
| 4,310,770 | 1/1982 | Keener | 307/39 |
| 4,324,987 | 4/1982 | Sulliva, II | 307/38 |
| 4,549,274 | 10/1985 | Lerner et al. | 307/39 |
| 4,626,953 | 12/1986 | Nilssen | 307/31 |
| 4,656,835 | 4/1987 | Kidder | 307/39 |
| 4,694,192 | 9/1987 | Payne | 307/39 |
| 5,436,510 | 7/1995 | Gilbert | 307/39 |
| 5,469,000 | 11/1995 | Geysen | 307/39 |
| 5,481,140 | 1/1996 | Maruyama | 307/38 |

FOREIGN PATENT DOCUMENTS

| | | |
|---|---|---|
| 57-157479 | 9/1982 | Japan . |
| 61-96794 | 6/1986 | Japan . |
| 63-131542 | 8/1988 | Japan . |
| 464944 | 6/1992 | Japan . |
| 4372529 | 12/1992 | Japan . |
| 5211729 | 8/1993 | Japan . |

*Primary Examiner*—Jonathan Wysocki
*Assistant Examiner*—Peter Ganjian
*Attorney, Agent, or Firm*—Beveridge, DeGrandi, Weilacher & Young, LLP

[57] ABSTRACT

An operation control device for use in an electric power supply system for supplying electric power from one electric power source to a plurality of electric power consuming systems, which can determine based on an outside signal whether or not the electric power consuming systems can proceed to operations includes an output electric power detecting unit for detecting electric power outputted by the electric power source; and a comparison control unit for comparing a detected value of the output electric power detecting unit with a preset reference value to output a comparison signal indicative of a result of the comparison as the outside signal to be supplied to the plural electric power consuming systems. The comparison signal indicating an inoperable state when the detected value exceeds the reference value, whereby the electric power consuming systems are permitted to proceed to steps of their operations or stand by. As a result, a plurality of electric power systems can be efficiently administered in consideration of a total electric power consumption amount.

5 Claims, 7 Drawing Sheets

OPERATION CONTROL DEVICE AND METHOD FOR A PLURALITY OF ELECTRIC POWER CONSUMING SYSTEMS

BACKGROUND OF THE INVENTION

The present invention relates to a device for controlling operations of a plurality of electric power consuming systems for use in processing apparatuses, etc. which conduct required processing on objects to be processed, such as semiconductor wafers, etc., and a method for controlling a plurality of electric power consuming systems by the same.

Generally in oxidizing objects to be processed, such as semiconductor wafers, LCD substrates, etc. and forming diffused layers, silicon oxide films, silicon nitride film, etc. on the objects to be processed, various heat treatment apparatuses and plasma treatment apparatuses are used.

Usually in fabricating products by sequentially making treatments on semiconductor wafers, LCD substrates, etc., a plurality of treatment apparatuses for the same use or different uses are prepared, and for higher throughputs such treatment apparatuses are operated parallelly with each other. Semiconductor wafers, LCD substrates, etc. mainly require heat treatments and plasma treatments, and apparatuses for such treatments consume a relatively large amount of electric power. Electric power sources for such electric power are relatively expensive, and one electric power source is arranged to supply electric power to a large number of treatment apparatuses its electric power capacity can afford so that a smaller number of electric power sources can suffice.

Electric power consumed by respective treatment apparatuses are not always constant while they are in operation, and the electric power consumption much varies depending on recipes and also on steps included in one recipe. To be specific, in one of the treatment apparatus, e.g., a heat treatment apparatus, electric power is not much consumed when semiconductor wafers are transferred onto the wafer boat, but highest electric power is required when the interior of the processing furnace is heated up to a processing temperature, e.g., 1000° C. The respective treatment apparatuses are not administered in interrelationship with one another, and upon receipt of commands of processing start, respectively go on executing steps of their required recipes.

Thus the electric power consumption varies depending on kinds of steps of recipes being executed, and when an electric power supply amount of an electric power source for a plurality of treatment apparatuses exceeds an allowable output electric power, a protection circuit or others is actuated to break the electric power supply. It is possible that such breakage of the electric power supply during execution of a step may make objects being treated unqualified as proper products. Abrupt breakage of the electric power supply must be avoided.

As a result, conventionally it has been unavoidable to connect a considerably decreased numbers of treatment apparatus to one electric power source so as to give a large margin to an allowable output electric power, whereby security against breakage of the electric power supply.

Resultantly an unnecessarily larger number of electric power sources needs to be installed. This has led to higher costs of a processing unit. When the electric power supply is broken by, e.g., a thunderbolt or others and is restored, all the treatment apparatuses start at once temperature increasing operations at full power to their required keep temperatures. In this case, large amounts of electric power are concurrently consumed, and required electric power supply cannot be afforded.

Recently especially for the purpose of preventing formation of natural oxide films on objects to be processed and other purposes, fast temperature processing apparatuses which can quickly raise temperatures are developed. The fast temperature processing apparatuses consume much electric power upon increase of temperatures. For example, the conventional processing apparatuses consume electric power of 40 KW/hour upon increase of temperatures, and in contrast to this the fast temperature processing apparatuses consume electric power as much as 70 KW/hour. If a plurality of such fast temperature processing apparatuses are connected to one electric power source, there is a risk that the electric power consumption may easily exceed allowable output electric power. It has been desired to solve the above-described disadvantage sooner.

In view of the above-described disadvantage involved in the conventional operation control of the electric power consuming systems, the present invention was made. An object of the present invention is to provide a device for controlling operations of a plurality of electric power consuming systems and a method for controlling a plurality of electric power consuming systems by the use of the same, which can efficiently administer the plural electric power consuming systems in consideration of a total electric power consumption.

SUMMARY OF THE INVENTION

To solve the above-described disadvantage, the present invention provides an operation control device and method for use in an electric power supply system for supplying electric power from one electric power source to a plurality of electric power consuming systems, which can determine based on an outside signal whether or not the electric power consuming systems can proceed to operations comprising an output electric power detecting unit for detecting electric power outputted by the electric power source; and a comparison control unit for comparing a detected value of the output electric power detecting unit with a preset reference value to output a comparison signal indicative of a result of the comparison as the outside signal to be supplied to the plural electric power consuming systems, the comparison signal indicating an inoperable state when the detected value exceeds the reference value.

In the present invention having the above-described constitution, output electric power from the electric power source is detected by the output electric power detecting unit, and a detected value is compared with a reference value by the comparison unit. The reference value corresponds to a value of a maximum allowable output electric power including some margin.

When a detected value is smaller than the reference value, the output electric power has allowance, and the comparison signal is outputted to be indicative of the operable state. Oppositely when a detected value is larger than the reference value, the output electric power has not allowance, and the comparison signal is outputted to be indicative of the inoperable state.

Here respective electric power consuming systems, e.g., heat treatment apparatuses, etc. for semiconductor wafers are programmed to refer to an outside signal for improved users' universality when the apparatuses start their operations and execute steps of their recipes. The comparison signal is referred to at the start of their operations or steps of their recipes, whereby when an output electric power amount has no allowance (inoperable state), start of operations or steps of the rest apparatuses is stopped, and the rest apparatuses stand by.

When processing is finished or proceeded to steps which require smaller electric power consumption amounts, and the output electric power amount has allowance (operable state), the stand-by apparatuses start their operations or proceed to perform the steps.

Plural kinds of reference values of different levels are prepared, and comparison signals corresponding to the reference values are outputted, whereby the respective electric power consuming systems can be controlled on multi-stages. For example, a comparison signal corresponding to a small reference value is referred to when that of the steps of recipes requiring a largest electric power consumption amount is started, and a comparison signal corresponding to a large reference value is referred to at the start of steps which do not require large electric power consumption amounts or at the start of the operations of the electric power consuming systems.

The constitution of the present invention makes it possible to efficiently administer the operations of respective electric power consuming systems so that a total electric power consumption of the electric power consuming systems do not overload the electric power source.

BRIEF DESCRIPTION OF THE DRAWINGS

FIG. 2 is a view explaining steps of one treatment of one of the electric power consuming systems the operation control device according to the present invention is applied to.

DETAILED DESCRIPTION OF PREFERRED EMBODIMENTS OF THE INVENTION

The operation control device for controlling a plurality of electric power consuming systems and an operation control method for controlling a plurality of electric power consuming systems by the device according to one embodiment of the present invention will be explained with reference to the drawings attached hereto.

Figure 1:
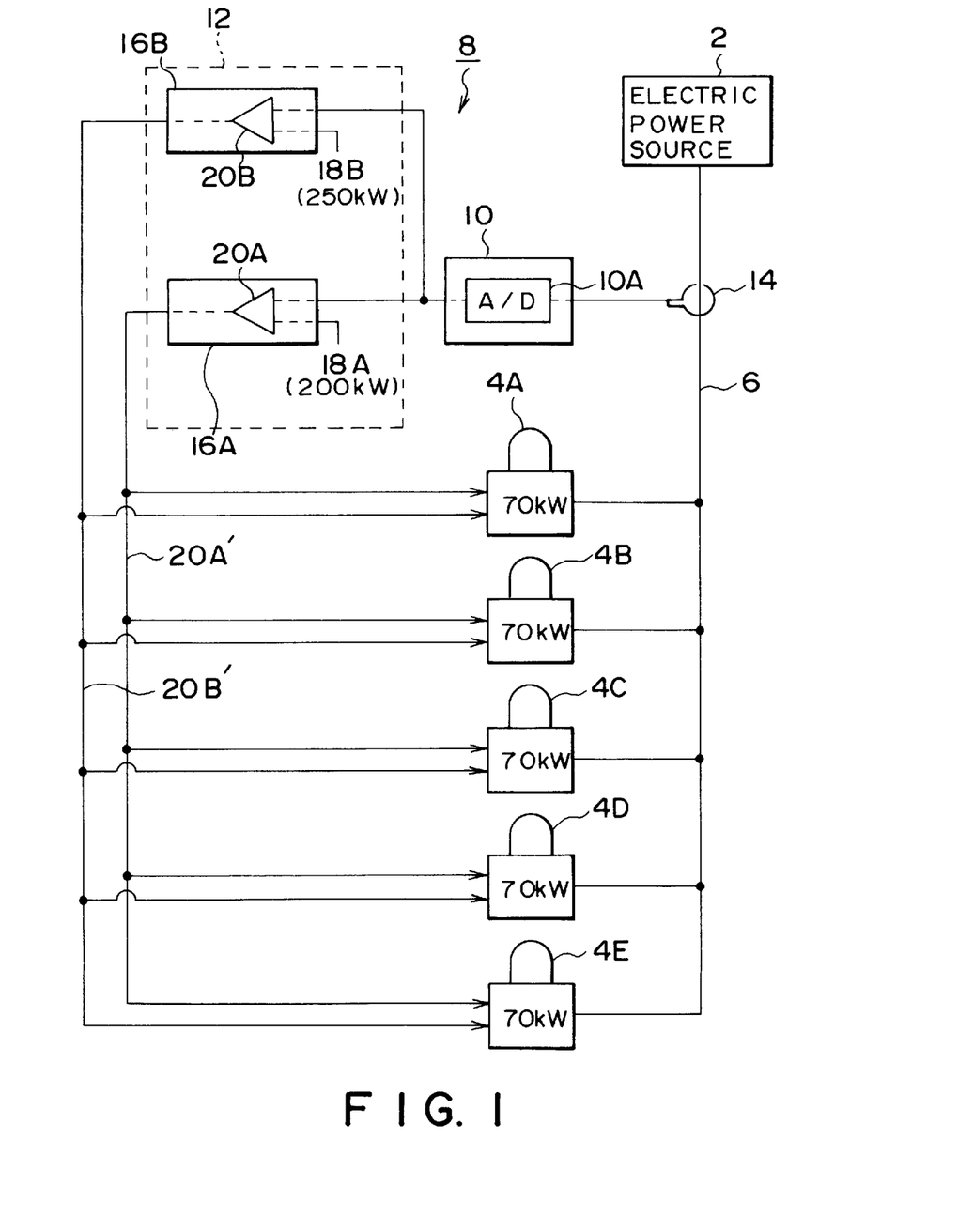
FIG. 1 is a block diagram of the operation control device according to the present invention applied to a plurality of electric power consuming systems.
Figure 2:
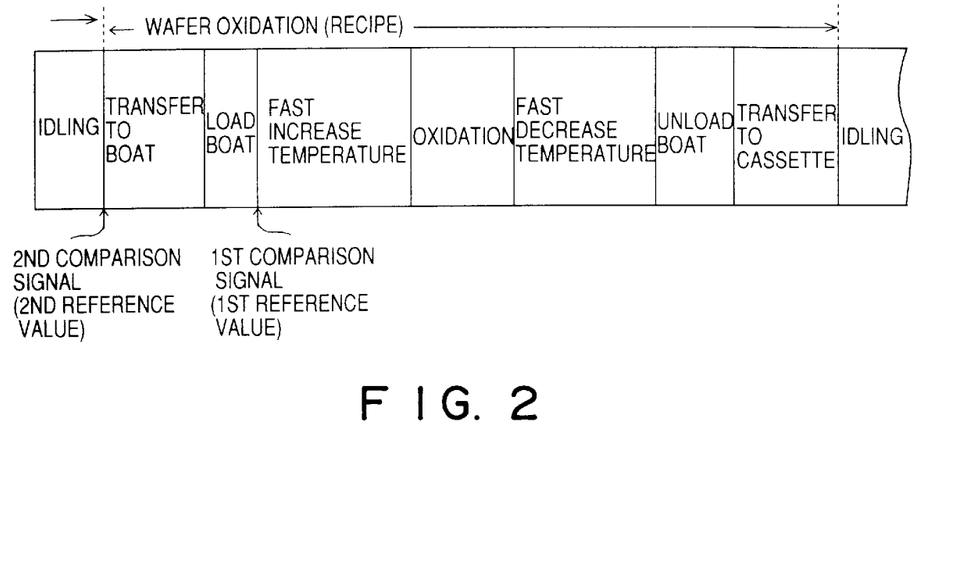
Figure 3:
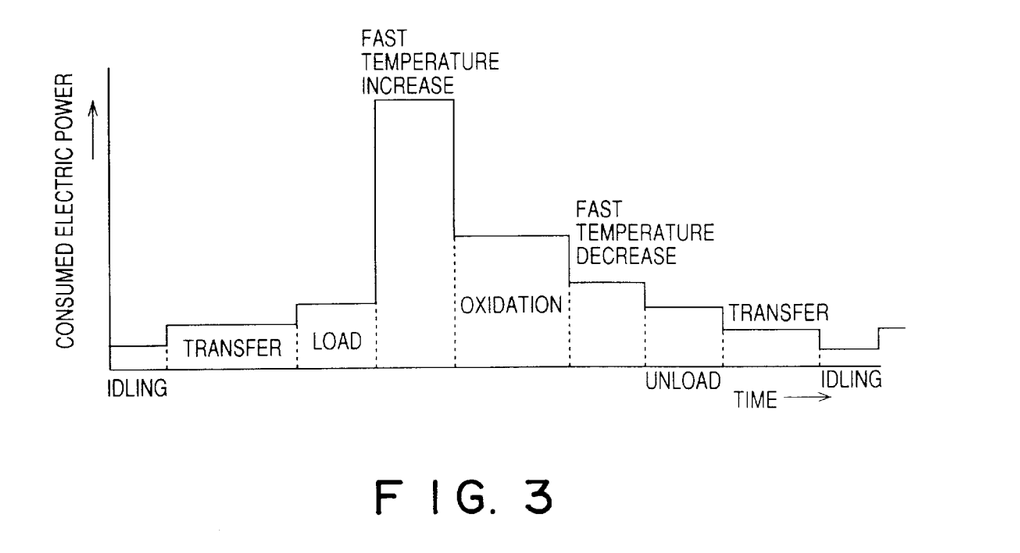
FIG. 3 is a graph of electric power consumption amounts required to execute the respective steps shown in FIG. 2.

FIG. 1 is a block diagram of the operation control device provided for a plurality of electric power consuming systems. FIG. 2 is an explanatory view of steps of a recipe associated with one of the electric power consuming systems. FIG. 3 is a graph of electric power consumption amounts for execution of the respective steps of FIG. 2.

First, the electric power supply system will be explained. As shown in FIG. 1, a plurality of electric power consuming systems, 5 electric power consuming systems in the embodiment of FIG. 1, e.g., semiconductor wafer processing apparatuses 4A–4E are connected parallel to an electric power source 2 by an electric power supply line 6, and supply electric power to the processing apparatuses in accordance with demands thereof. The electric power source 2 has a maximum electric power capacity, i.e., a maximum allowable output electric power and cannot output electric power beyond the capacity.

The processing apparatuses 4A–4E are of the same kind or of different kinds as described above to make processing of the same kind or different kinds on semiconductor wafers. For example, each processing apparatuses may be a plasma treatment apparatus, a heat oxidation apparatus, a heat diffusion apparatus, a CVD apparatus, a high speed temperature raising heat treatment apparatus, etc. which are combined suitably in accordance with user's requirements.

Generally each of the processing apparatuses has the operation controlled by a control unit, e.g., a microcomputer, etc., built therein. A content to be processed, i.e., the so-called recipe is programmed and stored in the microcomputer, and semiconductor wafers are processed in accordance with the recipe. The same recipe or different recipes are stored respectively in the control units of the respective processing apparatuses. A recipe for one processing usually includes a plurality of steps, and electric power consumption amounts for the respective steps are different from each other.

Here oxidation of semiconductor wafers by a high speed temperature raising heat treatment apparatus will be explained as one example of the recipes. To conduct oxidation on semiconductor wafers, as shown in FIG. 2, the idling step of idling the processing apparatuses, the step of transferring semiconductor wafers onto the wafer boat; the wafer boat loading step of loading the wafer boat into the processing furnace; the fast temperature increasing step of quickly increasing a temperature of the semiconductor wafers to a prescribed process temperature; the oxidation step of introducing a processing gas, etc., maintaining the semiconductor wafers at the process temperature to conduct oxidation; the fast temperature decreasing step of quickly decreasing the temperature of the processed semiconductor wafers, the wafer boat unloading step of unloading the wafer boat out of the processing furnace, and the transferring step of taking the processed semiconductor wafers out of the wafer boat and transferring the processed semiconductor wafers to a wafer cassette are carried out in the stated order, and again the idling step follows.

As shown in FIG. 3, the largest one of the electric power consumption amounts of the respective steps is for the fast temperature increasing step.

Such processing or recipe is so programmed in consideration of users' universality that at the start of the processing or the recipe and at the start of each step, it is decided based on an outside signal whether or not the operation is advanced. Unless the outside signal is supplied, the operation is carried on.

The respective processing apparatuses 4A–4E in FIG. 1 are controlled independently of one another by the respective control units built therein and execute their processing in sequence of instructions irrespective of the operations of the other processing apparatuses.

Under these circumstances, here it is assumed that some, for example, of the processing apparatuses concurrently carry out their respective steps which consume a largest electric power consumption amount. Output electric power which exceeds a maximum allowable electric power amount is demanded of the electric power source 2, and it is often a case that the electric power source 2 cannot meet the demand. For such case, the device for controlling operations of a plurality of electric power consuming systems according to the present invention is disposed to suitably control proceeding of operations of the respective processing apparatuses. When output electric power is smaller than a prescribed value, the respective processing apparatuses are individually controlled to proceed with their respective operations independently of each other. When output electric power is larger than the prescribed value, the respective processing apparatuses are controlled to stop proceeding to their respective next step until the output electric power becomes smaller than the prescribed value, so that total output electric power does not exceed a maximum allowable electric power amount.

Specifically the operation control device 8 according to the present invention, which is shown in FIG. 1, mainly comprises an output electric power detecting unit 10 for detecting electric power outputted by the electric power source 2, and a comparison control unit 12 for comparing a detected value from the output electric power detecting unit 10 with a preset reference value and outputting a comparison signal indicative of a comparison result.

The output electric power detecting unit 10 detects current, supply voltage, etc. of the electric power supply line 6 by detecting means 14. A detected result is converted into a digital signal by an A/D converter 16 or others incorporated in the output power detecting unit 10 to be supplied to the comparison control unit 12.

The comparison unit 12 comprises, e.g., a microcomputer, etc. In the present embodiment, a first comparison control means 16A and a second comparison control means 16B are arranged therein. A first reference value and a second reference value which are different from each other are set respectively in the comparison control means 16A, 16B. A detected value is compared with the first and the second reference values by a comparator 20A' and a comparator 20B' respectively incorporated in the comparison controlling means 16A, 16B. When the detected value is smaller than the reference values, the comparison signals are changed to indicate an operable state. Contrary to this, when the detected value is equal to or smaller than the reference values, the comparison signals are changed to indicate an inoperable state. These states correspond to a low level and a higher level of the comparison signals.

The respective comparison signals 20A, 20B outputted as results of the comparison between a detected value and the reference values are supplied to the respective processing apparatuses 4A–4E as outside signals, and are referred to as outside signals when the respective processing apparatuses start their operation or start specific steps. The comparison control unit 12 may be provided by, e.g., Demand Kanshi Seigyo Souchi (trademark) (Demand Monitor Control Device) by Mitsubishi Denki.

In this case, the first reference value is set at a value which is smaller than a maximum allowable electric power amount by an amount corresponding to an electric power consumption amount of a step which requires a maximum electric power consumption amount in the processing apparatuses 4A–4B, and the first comparison signal 20A is referred to the first reference value when steps of the respective processing apparatuses which require respective largest electric power consumption amounts are started.

The second reference value is set at a value which is larger than the first reference value 18A and smaller than the maximum allowable electric power consumption amount for less strict control and is referred to, for example, when the respective processing apparatuses are started.

In the present embodiment, the first and the second reference values are set, and the first and the second comparison signals 20A, 20B are outputted. For simplifying the control, the second reference value and the second comparison signal 20B are omitted, and the first reference value 18a and the first comparison signal 20A alone may be used.

Now, the operation control method using the operation control device having the above-described constitution according to the present invention will be explained.

For easy understanding of the operation control method, it is assumed that the respective processing apparatuses 4A to 4E shown in FIG. 1 are the same processing apparatuses, e.g., the high speed temperature raising heat treatment apparatus, that of the steps of each processing apparatus which requires maximum allowable electric power is the fast temperature increasing step, and a working electric power is 70 KW. Accordingly when the respective processing apparatuses concurrently conduct the fast temperature increasing step, a maximum electric power of 350 KW (70 KW×5) is required.

It is assumed that a maximum allowable electric power amount which can be supplied by the electric power source 2 is 270 KW. Then, the first reference value 18A is set at, e.g., 200 KW having a 70 KW allowance, which is a maximum electric power consumption amount of one heat processing apparatus. The second reference value 18B is set at, e.g., 250 KW to make the control less strict. Needless to say, the second reference value 18B is smaller than the maximum allowable electric power.

It is also assumed that as shown in FIG. 2, the first comparison signal 20A is beforehand set in a program so that the first comparison signal 20A is referred to as an outside signal immediately before execution of the fast temperature increase step, and the second comparison signal 20B is referred to at the start of an operation, i.e., immediately before the wafer transfer step of transferring wafers to a boat, which follows the idling state.

First, a simpler control method in which the second reference value 18B and the second comparison signal 20B are omitted, and only the first reference value 18A and the first comparison signal 20A are used will be explained.

First, the respective heat treatment apparatuses 4A–4E shown in FIG. 1 are individually supplied with electric power and are operated independently of each other under their respective control. Only when corresponding steps of the respective heat processing apparatuses are started, the first comparison signal as the outside signal is compared with the first reference signal to judge whether the corresponding steps may be executed or the heat treatment apparatuses stand by.

Meanwhile, the operation control device 8 incessantly monitors output electric power of the electric power source 2 and, based on a detected value, decides a state of the first comparison signal 20A.

Then, with reference to the flow chart shown in FIG. 4, the operation of the operation control device according to the present invention will be explained. FIG. 5 shows relationships, at this time, between the output electric power and the first comparison signal. When the first comparison signal is Low, the first comparison signal indicates the operable state, and when the first comparison signal is High, the first comparison signal indicates the inoperable state. The output electric power is transient.

Figure 4:
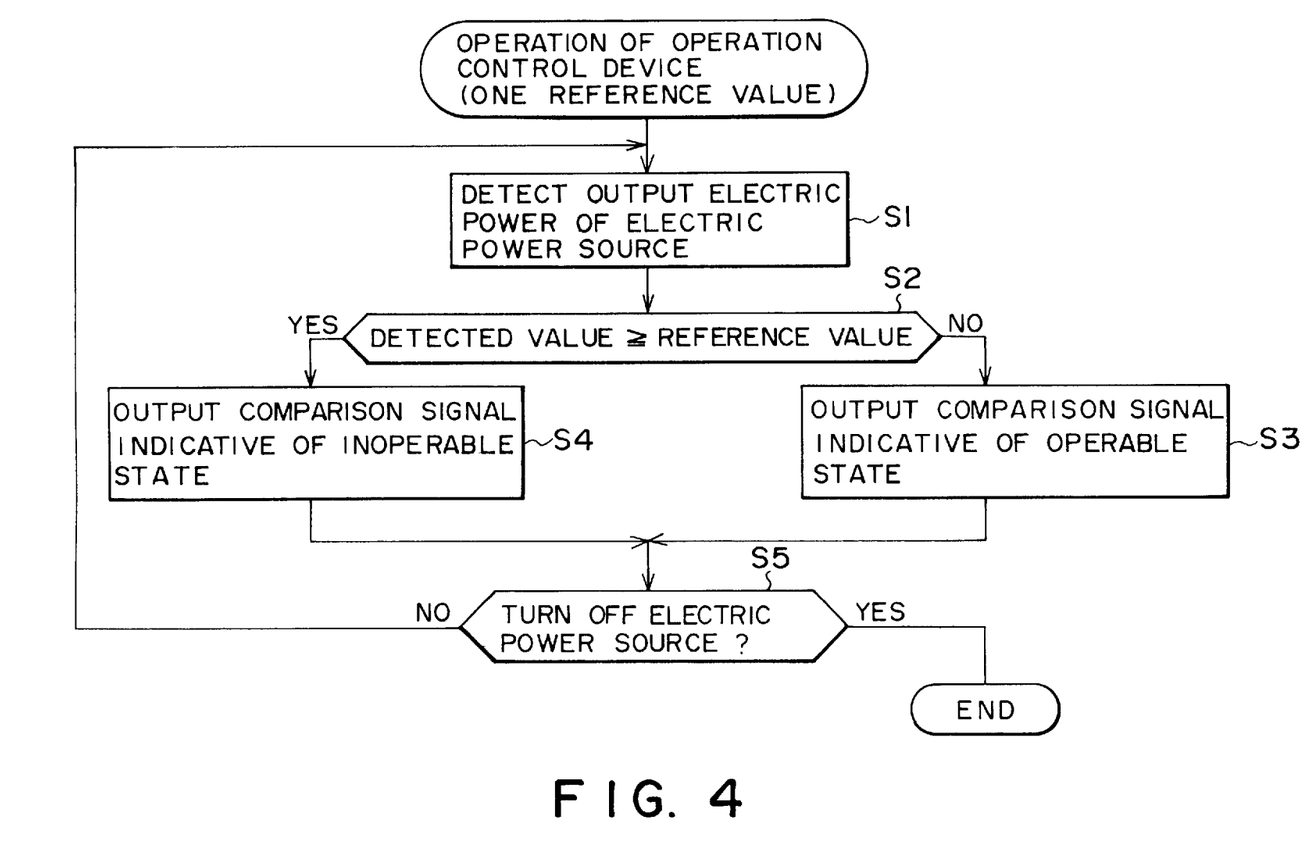
FIG. 4 is a flow chart of the operation of the operation control device according to the present invention, which uses one reference value.
Figure 5:
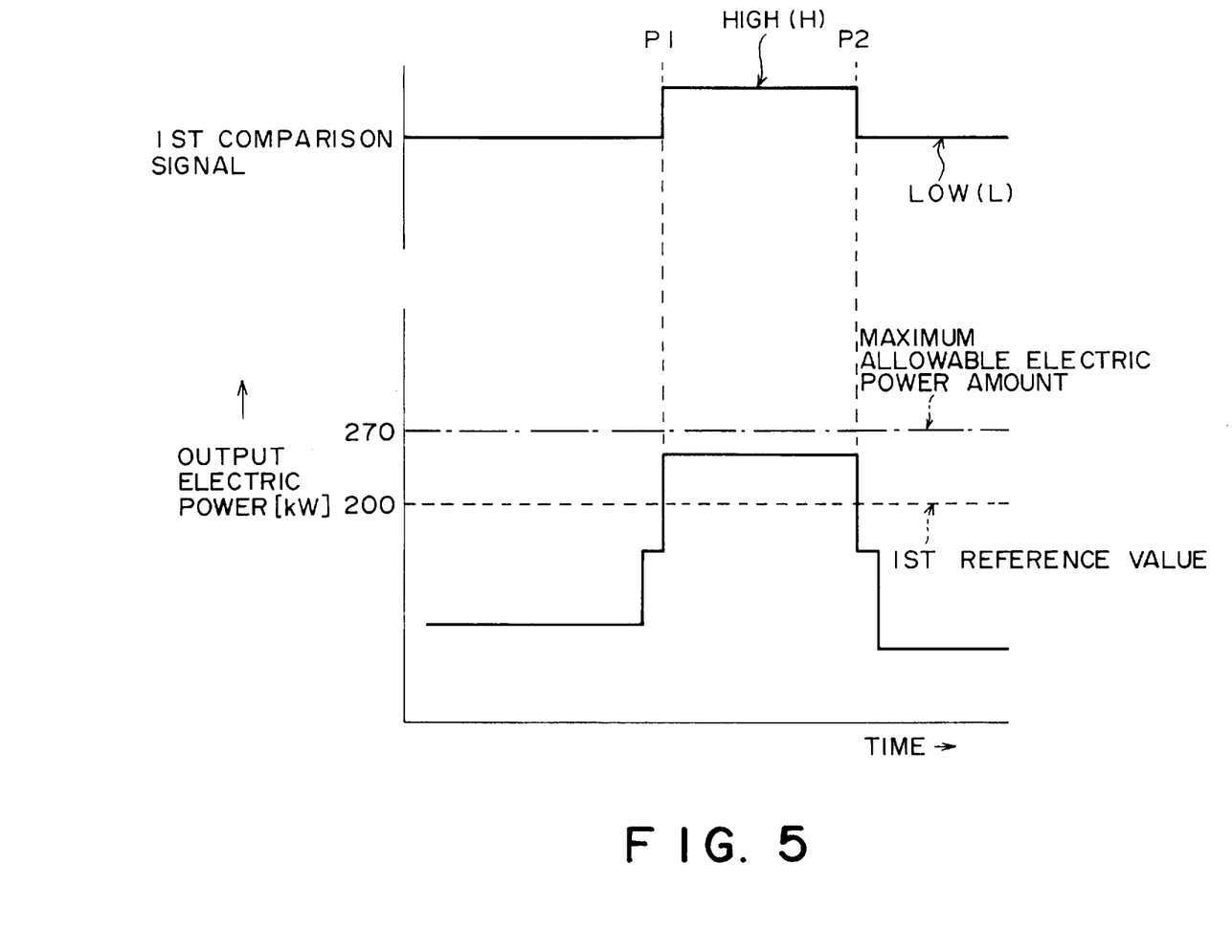
FIG. 5 is a graph of relationships between output electric power and a first comparison signal.

In FIG. 4, when electric power is supplied from the electric power source to the operation control device, an output of the electric power is detected by the output electric power detecting unit 10 in FIG. 1 (S1), and a detected value is compared with the first reference value 18A (200 KW) by the first comparator 20A of the comparison control unit 12 (S2). The second reference value, etc. are omitted in this explanation.

When the detected value is smaller than the first reference value 18A (NO), it means the electric power has allowance. The first comparison signal 20A is Low and outputted as a signal indicating the operable state (S3). As will be explained later, execution of the fast temperature increasing step is permitted.

Contrary to this, when the detected value is larger than the first reference value 18A (YES), it means the electric power has no allowance. The first comparison signal 20A is High and outputted as a signal indicating the inoperable state (S4). Execution of the fast temperature increasing step is not permitted, and the heat treatment apparatuses stand by. In FIG. 5, at the point 1 an electric power consumption amount is larger than the first reference value, and the first comparison signal is changed from Low to High. At the point P2, an electric power consumption amount is smaller than the first reference value, and the first comparison signal is changed from High to Low.

This string of the steps is repeated until the control electric power of the operation control device is turned off (see S5 in FIG. 4), and when the control electric power of the device is turned off, the string of the steps is stopped.

Figure 6:
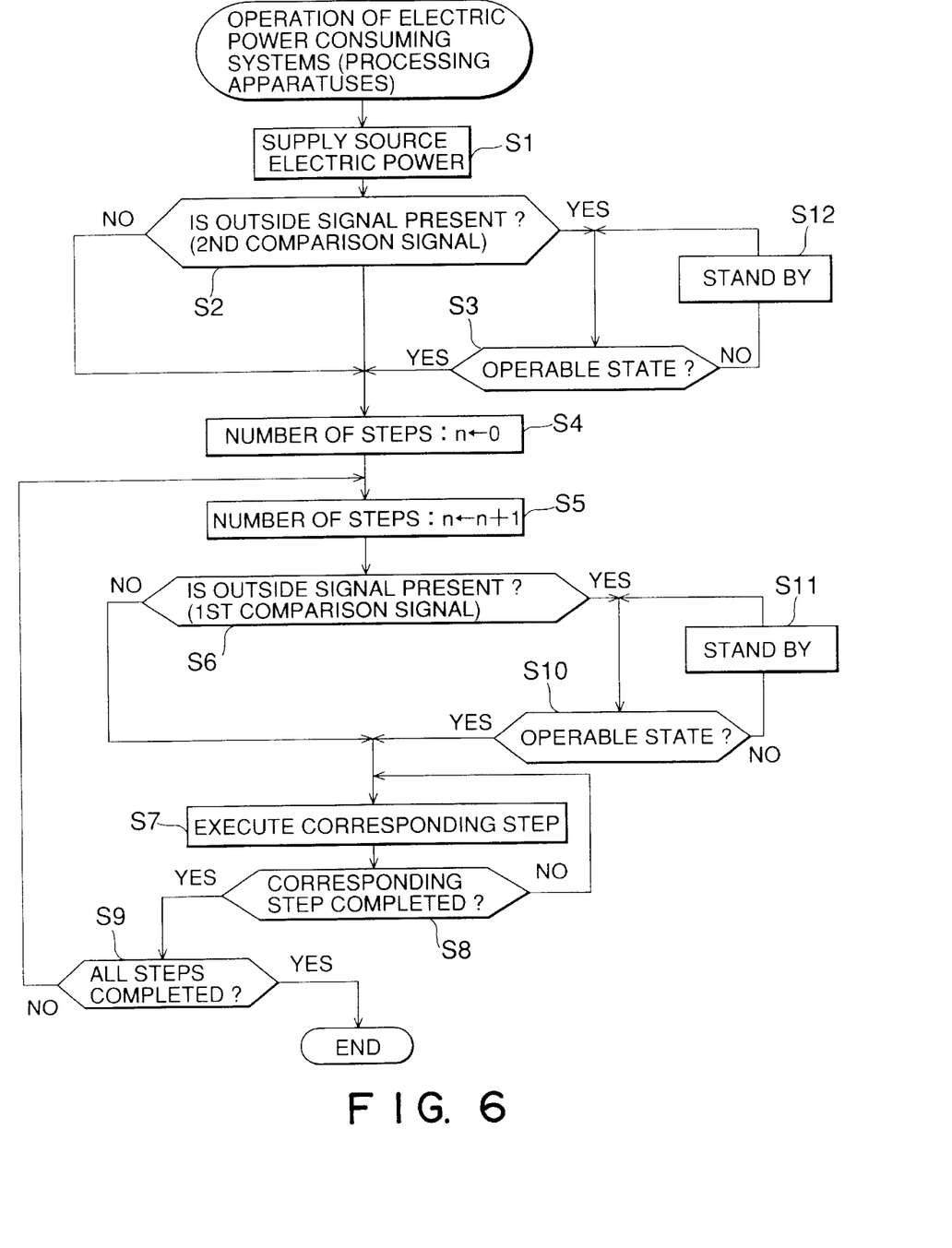
FIG. 6 is a flow chart of the operation of the electric power consuming system (treatment apparatus).

Then, the operation of one, for example, of the heat treatment apparatuses at this time will be explained. FIG. 6 is the flow chart of the operation of the heat treatment apparatus at this time.

First, when the electric power is supplied to the heat treatment apparatus (S1), the heat treatment apparatus starts idling and confirms based on presence of the outside signal whether or not the operation is started (S2). The heat treatment apparatus confirms NO because the outside signal is not referred to at the start of the operation. As will be described later, when the second comparison signal is used, YES is confirmed, and the next step S3 follows.

When NO is confirmed in the step S2, a step number n is initialized to be zero to execute a prescribed recipe (S4), and the step number n is increased by 1 (S5), and the next step follows.

Next, it is judged whether or not the outside signal is present (S6). When the judgement is No, processing of the corresponding step is carried out. This step is set going until the processing is completed; when this step is for transferring wafers to a boat, the step is set on going until the transfer is completed (S8).

When the corresponding step is over, it is judged whether or not all the steps have been completed (S9). When all the steps are completed (YES), the treatment is over. When NO is confirmed, the step is returned to the step S5, and the step number n is increased by 1, and the next step follows.

Steps of one recipe are thus sequentially carried out, and when the fast temperature increasing step follows, the judgement is YES in the step S6 because, as described above, the outside signal is programmed to be referred to before the start of the step S6. Then it is judged whether or not the outside signal, i.e., the first comparison signal 20A indicates the operable state (Low) or the inoperable state (High) (S10). The operable state (YES) indicates that the rest heat treatment apparatuses do not use much electric power, and the electric power source has allowance. Processing of the corresponding step, the fast temperature increase in this case, is carried out (S7).

Contrary to this, when the comparison signal indicates the inoperable state (High) in the step S10, it means that the electric power source has no power allowance. Processing of the corresponding step is not started, and the heat treatment apparatuses stand by until the comparison signal indicates the operable state (S11).

Thus, in the state in which a total electric power consumption amount is small and is smaller than the first reference value (the operable state), processing of respective steps is advanced without stand-by. When a total electric power consumption amount is large and is larger than the first reference value, the first comparison signal indicates the inoperable state. While the inoperable state is retained, the operation of the rest heat treatment apparatuses whose processing is immediately before the fast temperature increasing step is stopped, and the heat treatment apparatuses stand by. In the rest of the heat treatment apparatuses, steps except the fast temperature increasing step are sequentially executed.

Thus, the operation of the respective electric power consuming units can be efficiently controlled, and the electric power source 2 is protected from demand of an output electric power amount above maximum allowable electric power of the electric power source 2 by the electric power consuming units.

Figure 7:
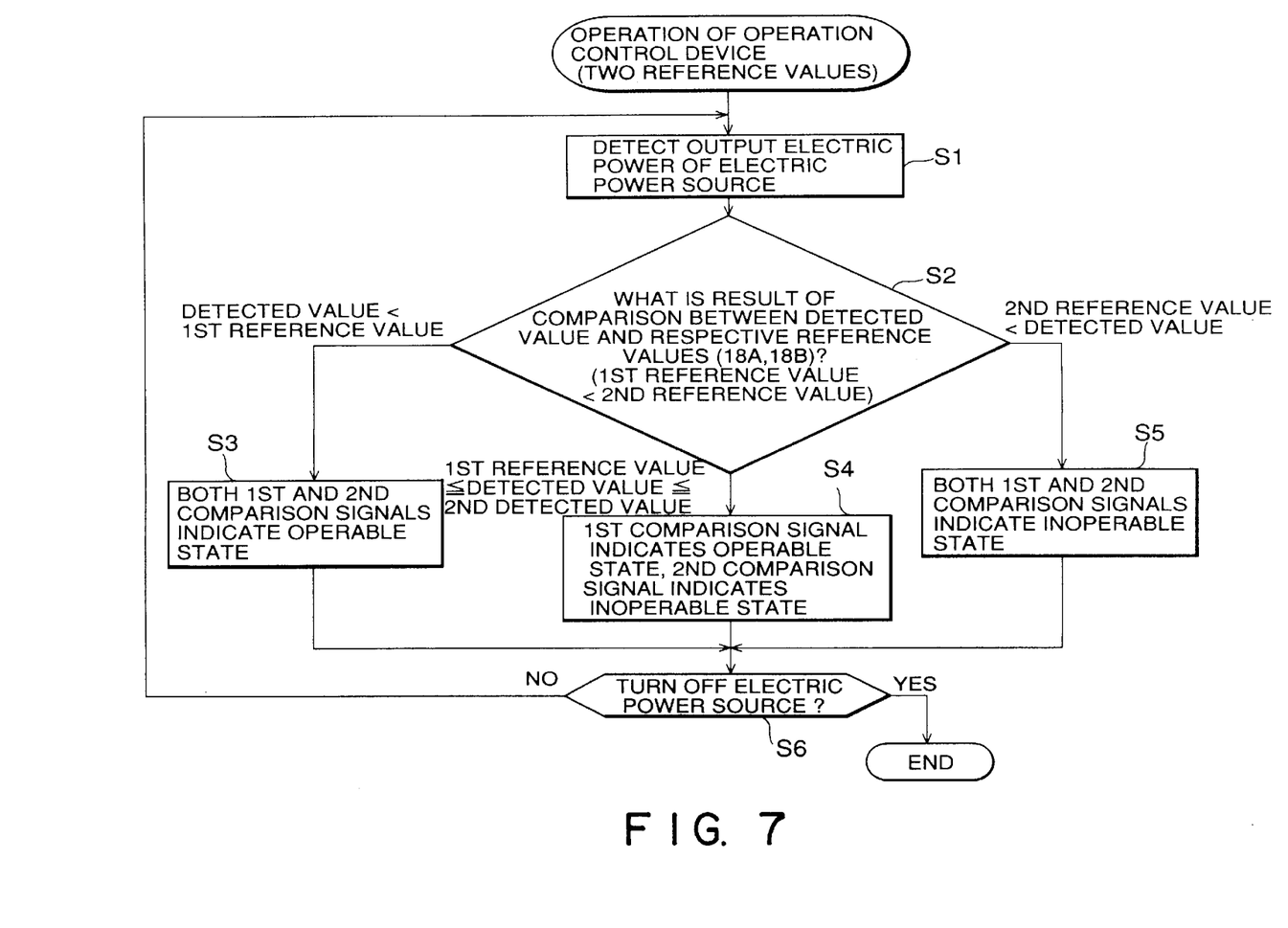
FIG. 7 is a flow chart of the operation of the operation control device according to the present invention, which uses two reference values.

Now, the operation using the second reference value and the second comparison signal as well as the first reference value and the first comparison signal will be explained with reference to the flow chart of FIG. 7 and FIG. 8.

Figure 8:
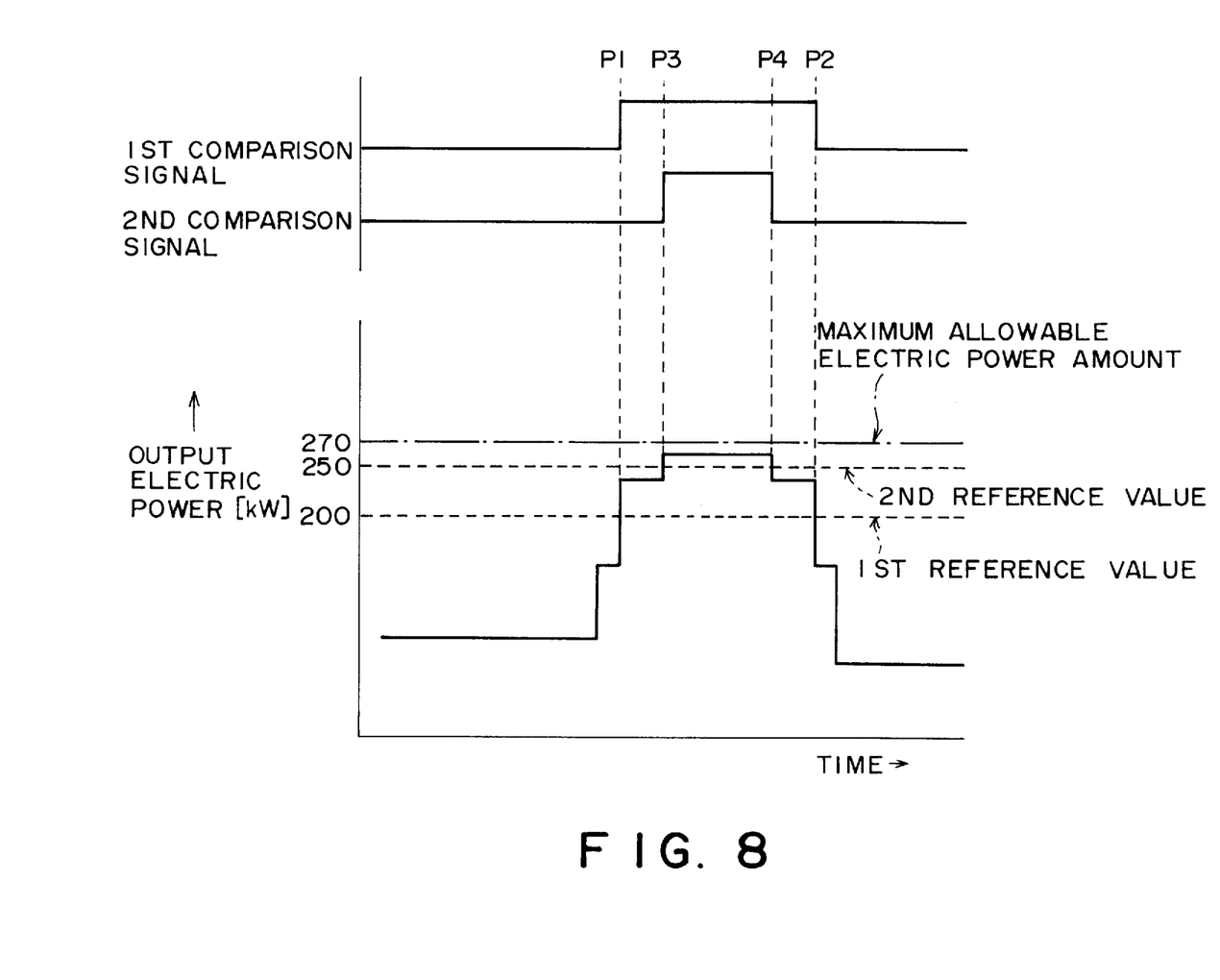
FIG. 8 is a graph of relationships between output electric power, and the first and the second comparison signals used in FIG. 7.

The second reference value is less strict as described above, and the second comparison signal 20B corresponding to the second reference value is changed, as shown in FIG. 8, from Low to High or High to Low at the point 3 and the point 4 when output electric power exceeds 250 KW which is the second reference value.

In the case that one kind of the comparison signal alone is used as described above, start of steps consuming large electric power amounts can be hindered, but start of steps consuming small electric power amounts cannot be hindered. As a result, there is a risk that a plurality of such steps may concurrently take place, and a total electric power consumption amount for the steps may exceed a maximum allowable electric power amount. This is prevented.

By the use of a plurality of comparison signals, e.g., 2 comparison signals, a step consuming a large electric power consumption amount can be hindered from start, but also a step consuming a small electric power consumption amount can be hindered from start. Here the second comparison signal 20 will be explained by means of an example in which the second comparison signal 20B is referred to when the processing operation is started from the idling (see FIG. 2).

In FIG. 8, start of the fast temperature increasing step in another heat treatment apparatus is prevented between the point 1 and the point 2, and between the point 3 and the point 4 even start of the processing operation can be prevented.

The states of the first and the second comparison signals 20A, 20B at this time will be explained with reference to FIG. 7. As in the flow chart of FIG. 6, an output electric power amount of the electric power source 2 is detected by the output electric detecting unit 10 (S1), and the detected value is compared with the first reference value 18A and the second reference value 18B by the comparison control unit 12 (S2).

When the detected value is smaller than the first reference value 18A (200 KW) having a smaller value, both the first and the second comparison signals are outputted to be indicative of the operable state (Low) (S3). When the detected value is larger than the first reference value 18A and below the second reference value 18B (250 KW), the first comparison signal 18A is outputted to be indicative of the inoperable state (High), and the second comparison signal 18B is outputted to be indicative of the operable state (Low) (S4). When the second detected value is larger than the second reference value (between the point 3 and the point 4 in FIG. 8),the first and the second comparison signals 18A, 18B are outputted to be both indicative of the inoperable state (High) (S5).

This operation is repeated until the operation control device is turned off (S6).

The operation of a treatment apparatus the present invention is applied to will be explained with reference to FIG. 6.

First, after electric power is supplied to the heat treatment apparatuses (S1), in the idling it is judged whether or not the outside signal is present to actually start the operation in accordance with recipes (S2). Different from what has been explained above, the second comparison signal 20B is programmed to be referred to, and the judgement is YES. It is judged whether or not the second comparison signal is indicative of the operable state (S3).

Here when an electric power consumption amount is small and smaller than 250 KW, the second comparison signal is indicative of the operable state (Low), and the step S4 follows. As described above, the operation is specifically started, and the wafers are processed in accordance with the recipes.

Contrary to this, when the judgement in the step S3 is that an electric power consumption amount is large and larger than 250 KW, the second comparison signal is indicative of the inoperable state (High), and the operation is not started, the heat treatment apparatuses stand by (S12). The stand-by is retained until the second comparison signal becomes indicative of the operable state.

The process flow thereafter is the same as described above, and proceeding of the fast temperature increasing step is controlled by a state of the first comparison signal 20A (S10). Accordingly, between the points P1 and P2 in FIG. 8, start of a step consuming high electric power consumption (the fast temperature increase step) in other heat treatment apparatuses is restricted, and between the points P3 and P4, even start of an operation is prohibited, and the idling is retained. By thus using comparison signals of the two kinds, the operation control can be flexible. In this case, even start of an operation can be prohibited, and accordingly it is prevented without failure that output electric power of the electric power source 2 is large and exceeds a maximum allowable electric power amount.

In the present embodiment, the second comparison signal is programmed to be referred to at the start of an operation, but this is not essential. The second comparison signal may be referred to at the start of, e.g., a step of a process, which consumes a second largest electric power amount. The mode of the reference can be any. It is also possible to use three or more comparison signals.

Needless to say, the above-described first and the second reference values, etc. are examples. Especially, as described above, the first reference value is set to be smaller than a maximum allowable electric power amount by a margin which is a little larger than an electric power consumption amount which corresponds to that of a maximum electric power consuming one of the steps of heat treatment apparatuses. For example, in the above-described case, the first reference value is set at 190 KW which is smaller than a 270 KW maximum allowable electric power amount by, e.g., an about 80 KW margin which is a little larger than a 70 KW electric power consumption amount of a maximum electric power consuming step.

In the above-described embodiment the present invention is unessentially applied to semiconductor wafers and is also applicable to processing apparatuses for processing other objects to be processed, e.g., LCD substrates.

As described above, the device for controlling operations of electric power consuming systems, and a method for controlling operations of electric power consuming systems by the device can attain the following good advantageous effects.

That is, a total electric power consumption amount of a plurality of electric power consuming systems is monitored to control proceedings of processing of the respective electric power consuming systems. Accordingly, when an electric power consumption amount is large, start of a maximum electric power consuming step in the respective electric power consuming systems can be stopped, and the systems stand by. Use of electric power exceeding a maximum allowable electric power can be prevented, and the electric power consuming systems can be efficiently administered while occurrences of electric power breakdown can be prevented with a result of higher throughputs. The electric power consuming systems can be efficiently administered, whereby a small number of electric power sources suffices, which can suppress equipment costs. A plurality of comparison signals having different reference levels are used, which makes the control flexible, whereby occurrences of electric power interruption can be more efficiently prevented.

What is claimed is:

1. An operation control device of a heat treatment apparatus for use in an electric power supply system for supplying electric power from one electric power source to a plurality of electric power consuming systems, which can determine based on an outside signal whether or not the electric power consuming systems can proceed operating, said operation control device comprising:

an output electric power detecting unit for detecting electric power outputted by the electric power source;

a comparison control unit for comparing a detected value of the output electric power detecting unit with a present reference value to output a comparison signal indicative of a result of the comparison as the outside signal to be supplied to the plural electric power consuming systems, whereby the comparison signal indicating an inoperable stand-by state when the detected value exceeds the reference value; and a determination means connected to each one of the plurality of electric sower consuming systems for determining based on the comparison signal as the outside signal whether there is sufficient electrical capacity to proceed to a next step, wherein the next step is a step requiring a largest electric power consumption amount as each one of the plurality of electric power consuming systems having a set of steps where each step uses a different electric sower consumption amount, whereby if there is insufficient electrical capacity the next step is not executed until sufficient electrical capacity exists.

2. The operation control device for a plurality of electric power consuming systems according to claim 1, wherein the comparison control unit outputs comparison signals corresponding to a plurality of the reference value having set values which are different from each other; the plural comparison signals are referred to as the outside signals immediately before the electric power consuming systems proceed to those of the respective steps in operation.

3. An operation control method of heat treatment for an electric power supply system for supplying electric power from one electric power source to a plurality of electric power consuming systems which can determine based on an outside signal whether or not the electric power consuming systems can proceed operating, the method comprising the steps of:

detecting output electric power from the electric power source;

comparing a detected value of the output electric power with a preset reference value to output a comparison signal as a result of the comparison;

supplying the comparison signal as the outside signal to the respective electric power consuming systems, whereby the comparison signal indicating an inoperable stand-by state when the detected value exceeds the reference values and determining based on the comparison signal whether there is sufficient electrical capacity to proceed to a next step, wherein the next step is a step requiring a largest electric power consuming systems having a set of steps where each step uses a different electric power consumption amount, whereby if there is insufficient electrical capacity the next step is not executed until sufficient electrical capacity exists.

4. The operation control method for a plurality of electric power consuming systems according to claim 3, wherein comparison signals corresponding to a plurality of the reference values; the plural comparison signals are referred to as the outside signals immediately before the electric power consuming systems proceed to those of the respective steps in operation.

5. The operation control method for a plurality of electric power consuming systems according to claim 4, wherein one of the plural comparison signals is referred to as the outside signal to determine whether or not the electric power consuming systems starts operations.

* * * * *